April 11, 1950          G. E. CAREY          2,503,468
CULTIVATOR
Filed Sept. 5, 1946          2 Sheets-Sheet 1
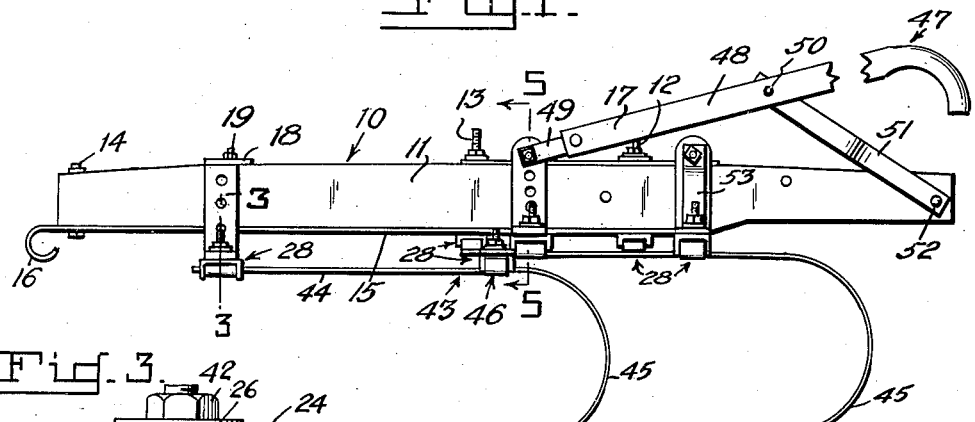
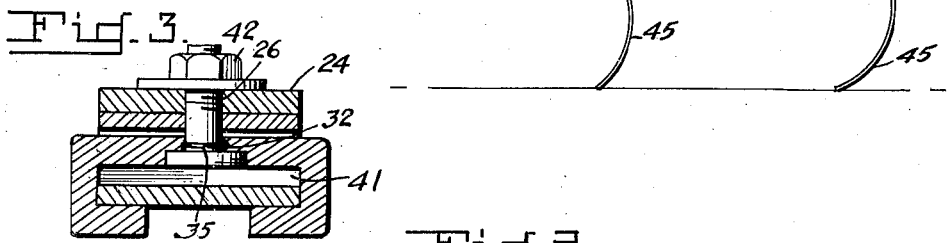
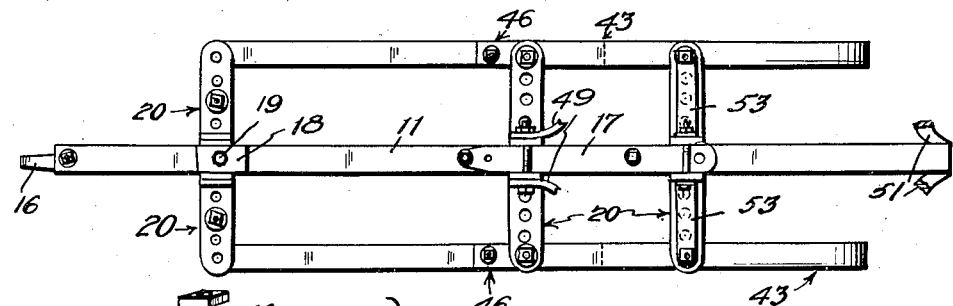
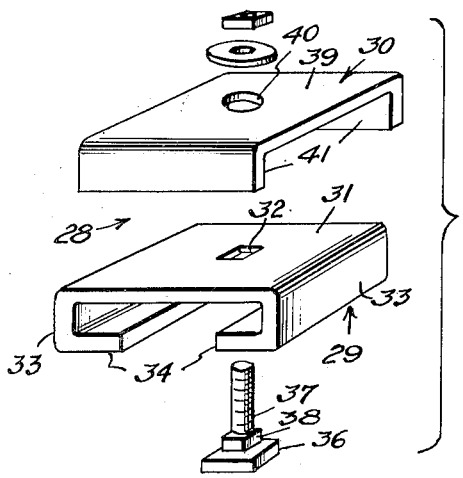
Inventor
George E. Carey
By Randolph & Beavers
Attorneys

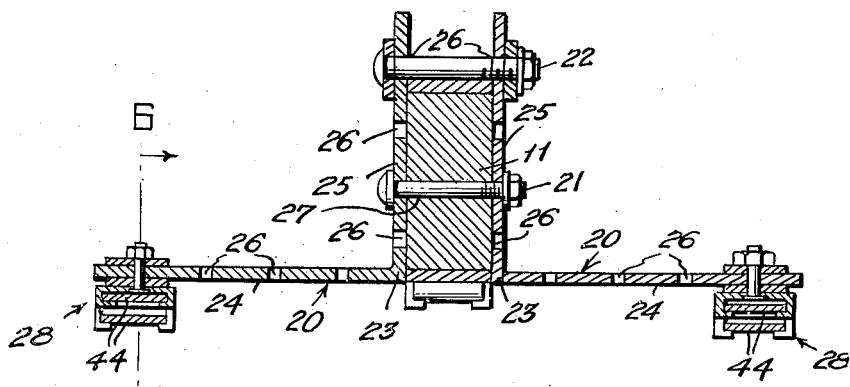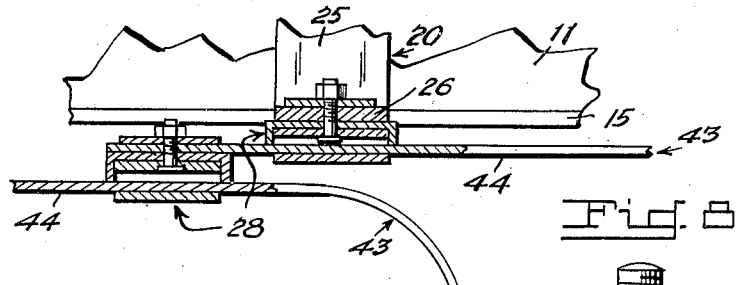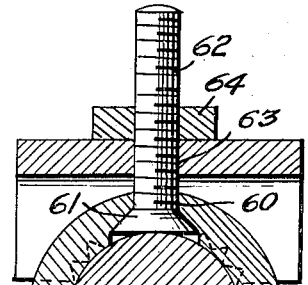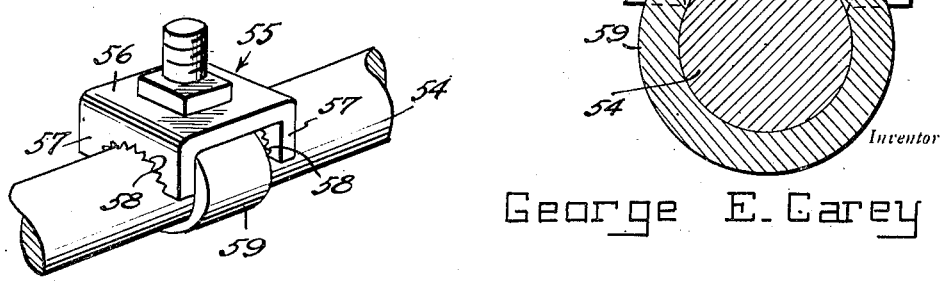

Patented Apr. 11, 1950

2,503,468

UNITED STATES PATENT OFFICE 2,503,468

CULTIVATOR

George E. Carey, Arab, Ala.

Application September 5, 1946, Serial No. 694,895

1 Claim. (Cl. 97—173)

This invention relates to a novel construction of farm implement and has a special reference to an improved construction of plow, although it will be readily apparent, as the description proceeds, that the novel features of the invention are not limited in their utility to plows, but may be utilized in connection with various types of cultivators, employed for a wide variety of uses in reference to the treatment of the soil.

For the purpose of illustrating one preferred application of the invention, the same has been illustrated and will be described in connection with a plow, and among the objects of the invention are to provide a plow which is so constructed and arranged that by simple manipulation of the few parts, any desired number of spring cultivating teeth may be mounted thereon and arranged in any desired formation, as for example, as a right or left side harrow, or in a V-shaped formation.

Still a further object of the invention is to provide a construction whereby through the use of but a single pair of supporting brackets or slats, a number of spring teeth may be disposed thereon in laterally and/or longitudinally spaced relationship to one another.

Still a further object of the invention is to provide a plow utilizing a novel construction of clamp for detachably fastening a spring tooth to a plow bracket or slat and by means of which the tooth may be adjustably engaged by one or a plurality of clamps, attached to one or a plurality of brackets for varying the resiliency of the tooth.

Another object of the invention is to provide a construction wherein the need for bracing the tooth supporting brackets is eliminated, due to the fact that the shanks of the teeth will sufficiently function in combination with the brackets and clamps, for bracing the brackets relatively to the plow beam or other supporting structure.

Still a further object of the invention is to provide an improved construction of plow having a novel arrangement of plow handles, which are so arranged with respect to the plow beam that a pressure thereon will force the cultivating teeth into the soil without tending to tilt the beam upwardly.

Numerous other objects and advantages of the invention will hereinafter become apparent as the description proceeds of the drawings, which illustrated preferred embodiments thereof, and wherein—

Figure 1 is a side elevational view of a plow constructed in accordance with the invention;

Figure 2 is a top plan view thereof and with the plow handles removed;

Figure 3 is an enlarged cross sectional view taken substantially along a plane as indicated by the line 3—3 of Figure 1;

Figure 4 is an enlarged exploded view of one of the cultivator tooth clamps;

Figure 5 is an enlarged cross sectional view taken substantially along a plane as indicated by the line 5—5 of Figure 1;

Figure 6 is a longitudinal sectional view taken substantially along a plane as indicated by the line 6—6 of Figure 5;

Figure 7 is a perspective view of a slightly modified form of the clamp, and

Figure 8 is an enlarged cross sectional view thereof.

Referring more specifically to the drawings, for the purpose of illustrating a preferred embodiment of the invention, a plow, designated generally 10, is illustrated in Figures 1 and 2 and includes an elongated plow beam 11 to the underside of which is secured by nut and bolts fastenings 12, 13 and 14, an elongated metal bar 15 which is of a width substantially corresponding to the width of the beam 11 and which is provided with a downwardly turned hook-shaped forward end 16 which is disposed forwardly of the beam 11 and by means of which the plow 10 may be attached to any suitable form of draft means. An elongated bar 17, the same width as the beam 11, is disposed on the upper side of the intermediate portion thereof and secured thereto by the fastenings 12 and 13 and a shorter bar 18, of the same width, is secured to the upper side of the beam 11, near its forward end, by a fastening 19.

A plurality of slats or brackets, each designated generally 20, are mounted in pairs on both sides of the beam 11 by nut and bolt fastenings 21 and 22, as best seen in Figure 5. The brackets 20 are each formed from an elongated metal bar, which is provided with a substantially right-angular bend 23, intermediate of its ends, forming legs 24 and 25 which are disposed substantially at right angles to one another, and which are each provided with a plurality of longitudinally spaced openings or apertures 26. As illustrated in Figure 5, the legs 25 of two of the brackets 20 are disposed against opposite sides of the beam 11 and are connected thereto by the fastening 21 which extends through corresponding openings 26 of the legs 25, and through an opening 27 of the beam. The fastening 22 extends likewise through corresponding openings 26 of the legs 25 and is disposed above the beam 11 and against the upper side of the reinforcing bar 17. The lower ends of the legs 25 or the bent portions 23 bear against the lower bar 15, so that the bars 15 and 17, by engagement with the legs 25 prevent the sides of the beam 11 from being indented thereby. The legs 24 of the bracket 20 project outwardly in opposite directions and on substantially the same plane and in alignment with the plane of the lower bar 15.

As illustrated in Figures 1 and 2, three sets or pairs of brackets 20 are disposed on the beam 11 in longitudinally spaced relationship and with the two rear pairs of brackets having their upper portions abutting against the upper bar 17 and with the forward pair of brackets having the upper portions thereof abutting against the upper bar 18. As the description proceeds, it will be readily apparent that any number of pairs of brackets 20 may be supported by the plow beam 11 in the manner as illustrated in Figures 1, 2 and 5, or said brackets 20 may be disposed only on one side of the plow beam, or may be arranged with a greater number of brackets on one side thereof than on the other side. Likewise the brackets 20 may be displaced upwardly or downwardly by positioning the fastenings 21 and 22 in different openings 26 of the upwardly extending legs thereof, for positioning the outwardly extending portions of the brackets at various levels with respect to the underside of the plow beam. Also the legs 24 and 25 may be made of various lengths so that any desired number of spring cultivating teeth may be supported by each bracket, as will hereinafter become apparent.

Each of the outwardly extending legs 24 of the brackets 20 support at least one clamp, designated generally 28, which may be connected to any one of the openings 26 thereof and may be provided with any number of such clamps 28, limited only by the number of openings 26. As best illustrated in Figures 3 and 4, each clamp 28 includes two clamped sections 29 and 30, each formed from a substantially rigid metal bar. The lower clamp section 29 is provided with a substantially flat upper intermediate portion 31 containing a polygonal-shaped opening 32, which is substantially centrally disposed. The portion 31 is provided with downturned substantially parallel sides 33 which terminate in inturned flanges 34 which are disposed substantially parallel to the upper portion 31 and the adjacent edges of which are spaced a substantial distance apart. The opening 32, as seen in Figure 3, is enlarged on the underside of the portion 31 at 35 and is shaped to receive and snugly engage the polygonal-shaped head 36 of a bolt 37. The head 36 is provided with a restricted shank portion 38 which is shaped to snugly engage the opening 32 to combine with the head 36 for keying the bolt 37 to the section 29, when the shank of the bolt 37 is disposed in upwardly projecting relationship thereto, as seen in Figure 3. The upper clamp section 30 is provided with an intermediate, substantially flat portion 39 which is adapted to rest on the upper side of the portion 31 and which is provided with a central opening 40 through which the threaded shank of the bolt 37 extends. The portion 39 is provided with downturned ends or flanges 41 which are disposed at right angles to the sides 33 and which depend beyond the sides edges of the portion 31, as best seen in Figure 3. The bolt shank extends upwardly through the opening 40 and through an opening 26 of one of the bracket legs 24 and is provided with a nut 42 at its upper end for securely clamping the clamp 28 beneath said bracket leg 24 and with the portion 39 bearing against the underside thereof.

A conventional spring cultivator tooth 43 including a substantially straight and flat shank portion or standard 44 and a downwardly curved end 45, is adapted to be supported on one or a plurality of the brackets 20 by one or a plurality of the clamps 28. The spring teeth 43 are each formed from a bar of resilient metal and the clamp sections 29 are each sized so that the shank portion 44 thereof will pass readily between the sides 33 and between the portion 31 and flanges 34, as illustrated in Figure 3. Consequently, when the nut and bolt fastenings 37, 42 are tightened, the depending ends or flanges 41 will be moved into clamping engagement with the upper side of the spring tooth shank 44, so that the shank will be clamped between said flanges 34 to effectively retain the spring tooth 43 in any adjusted positions, relatively to the bracket 20. As illustrated in Figures 1 and 2, the elongated shanks 44 are clamped, in the manner just previously described, to two longitudinally spaced brackets 20, but if desired, may be secured by only a single clamp and bracket to the plow beam. By clamping the shank 44 to two of the brackets 20, the shank portion located therebetween provides a brace between said brackets so that the need for bracing the outwardly extending legs of the brackets to the plow beam by means of diagonal braces is eliminated.

The conventional spring teeth 43 are provided with one or more openings in the shank portion 44 thereof to normally receive fastenings for securing the teeth to plows or cultivators. Such openings are not utilized in attaching the standards to the brackets 20 through the clamp means 28, but may be employed for mounting additional clamps 28 beneath the shanks 44, as illustrated at 46 in Figures 1 and 2. When this arrangement is employed, the clamps 28 which depend from the standard 44, engage standards of other spring teeth 43 and may provide the sole support for the last mentioned spring teeth or said last mentioned spring teeth may be additionally connected by clamps 28 to other brackets 20, for example as illustrated in Figures 1 and 2 to the forwardmost pair of brackets 20. As previously stated, by varying the location of the clamps 28 relatively to the shank or standard portions 44, the resiliency of the downturned, soil engaging ends 45 of the teeth 43 may be varied.

The nut and bolt fastenings 12 and 13 may be constructed to correspond to the nut and bolt fastenings 37, 42 for mounting clamps 28 against the underside of the reinforcement bar 15 for supporting one or more additional spring teeth 43, directly beneath the plow beam 11.

With the arrangement previously described, it will be readily apparent that a single bracket 20 with a single clamp 28 may support a spring tooth 43 and by attaching additional clamps to the shank 44 thereof an additional spring tooth may be supported thereby and may in turn support another spring tooth. Likewise, the clamps 28 may be arranged to support bars which are disposed transversely or obliquely to the plow beam 11 and to which additional clamps 28 may be attached for mounting additional spring teeth 43 in any desired arrangement or formation on one or both sides of the plow beam.

A pair of wooden handles 47 are disposed above the rear part of the plow beam 11 and are provided with corresponding forwardly and downwardly extending shanks 48 which are disposed in converging relationship and to each of which is connected a bar 49 by means of longitudinally spaced fastenings 15. The bars 49 project beyond the forward ends of the shanks 48 and are fastened to one of the upper fastenings 22, preferably of the intermediate pair of brackets 20. A pair of diagonal braces 51 are secured at their lower, rear ends by fastening 52 to opposite sides of the plow beam 11, adjacent the rear end thereof, and said braces 51 are attached at their upper, forward ends to the rearmost fastening 50 of the two handle shanks 48 to combine with the bars 49 to form a connection to the plow beam 11 by portions which are obliquely disposed relatively to the longitudinal axis of said plow beam. Consequently, when a downward pressure is exerted on the handles 47, it will be transmitted through the braces 49 and 51 to the plow beam 11 to force the teeth portions 45 into the ground and without tending to tilt the forward end of the plow beam in an upward direction. If desired, and as illustrated in Figures 1 and 2 in reference to the rearmost pair of brackets 20, the remote ends of the legs 24 and 25 of the brackets may be braced by diagonal braces 53 which are fastened at their inner ends to the fastenings 22 and their outer ends to the fastenings 37, 42. The clamps 28, as illustrated in Figures 1 to 6 and as previously described, are intended to clamp substantially flat bars, such as the shank portions 44 and may obviously be made in various sizes for engaging bars of various widths and thicknesses. Likewise, it will be readily apparent that the brackets in conjunction with clamps could be utilized for securing plow standards or shanks or other shapes to the plow beam 11, as for example, a standard or shank of circular cross section, as illustrated at 54 in Figures 7 and 8. The clamp, designated generally 55, for engaging the standard 54, includes an upper section 56 which differs only from the upper section 30 of the clamp 28 in that its depending flanges 57 are provided with arcuate grooves or recesses 58 which are toothed or serrated. Instead of the lower clamp section 29, the clamp 55 is provided with a lower clamping section in the form of a sleeve 59 having an opening 60 therein, the inner portion of which is enlarged to snugly receive the polygonal-shaped head 61 of a bolt 62, the threaded shank of which extends through the opening 60 and through an opening 63 in the intermediate portion of the clamp section 56 and which is engaged by a nut 64 which bears on said clamped section 56 for drawing the clamping sleeve 59 inwardly thereof so that the shank portion 54 will be clamped between the outer portion of the sleeve 59 and the serrated recess portions 58 to effectively prevent displacement thereof within the clamp. Obviously, the clamp 55 may be utilized for clamping other elements such as cables or wires and the clamp 28 may be utilized for clamping other bar or ribbon-shaped elements.

Various other modifications and changes are likewise contemplated and may obviously be resorted to, without departing from the spirit and scope of the invention as hereinafter defined by the appended claim.

I claim:

A cultivator comprising a supporting beam, an arm projecting laterally from the supporting beam, a first clamp secured to the arm having a passage extending therethrough transversely of the arm, an elongated resilient cultivator tooth shank having an intermediate portion extending through the clamp passage and secured in said first clamp, a second clamp depending from and supported by the cultivator tooth shank and disposed forwardly of and spaced from the first clamp and having a passage corresponding to the passage of the first clamp disposed so that the passages of the clamps are substantially parallel, a second cultivator tooth shank secured in the second clamp and extending through the passage thereof and supported thereby, said cultivator tooth shanks each having a depending cultivator tooth on its rear end, the cultivator tooth of the second tooth shank being disposed in front of the cultivator tooth of the first mentioned tooth shank, a second arm projecting laterally from the beam and disposed forwardly of said first mentioned arm, a third clamp secured to said second arm and engaging another portion of the second cultivator tooth shank forwardly of the second clamp and combining with the first two mentioned clamps for varying the tension of the cultivator teeth and with said other clamps and the cultivator teeth shanks to form a brace between said arms.

GEORGE E. CAREY.

REFERENCES CITED

The following references are of record in the file of this patent:

UNITED STATES PATENTS

| Number | Name | Date |
|---|---|---|
| 259,869 | Kelly | June 20, 1882 |
| 789,994 | Myers | May 16, 1905 |
| 818,923 | Strickland | Apr. 24, 1906 |
| 1,018,465 | Williams | Feb. 27, 1912 |
| 1,274,866 | Ferguson | Aug. 6, 1918 |
| 1,858,114 | Roberts | May 10, 1932 |
| 2,092,679 | Nix | Sept. 7, 1937 |
| 2,100,499 | Whitehead | Nov. 30, 1937 |

FOREIGN PATENTS

| Number | Country | Date |
|---|---|---|
| 159,815 | Germany | Apr. 12, 1905 |